R. C. MEYERS.
HORSESHOE.
APPLICATION FILED JULY 7, 1909.
945,568.
Patented Jan. 4, 1910.
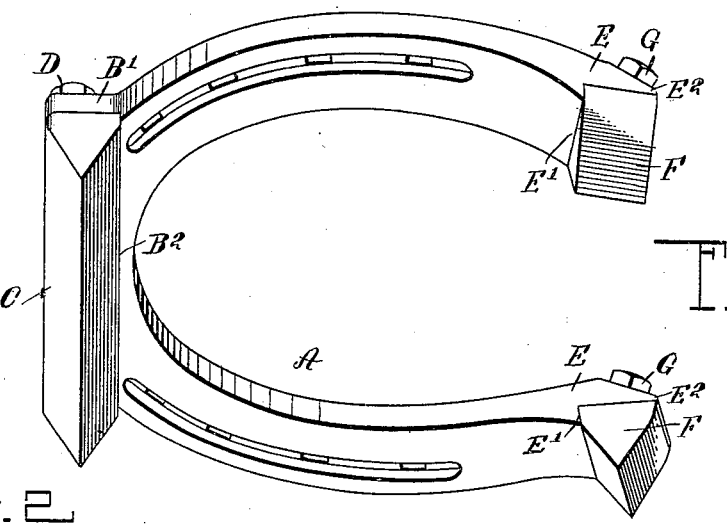
Fig. 1
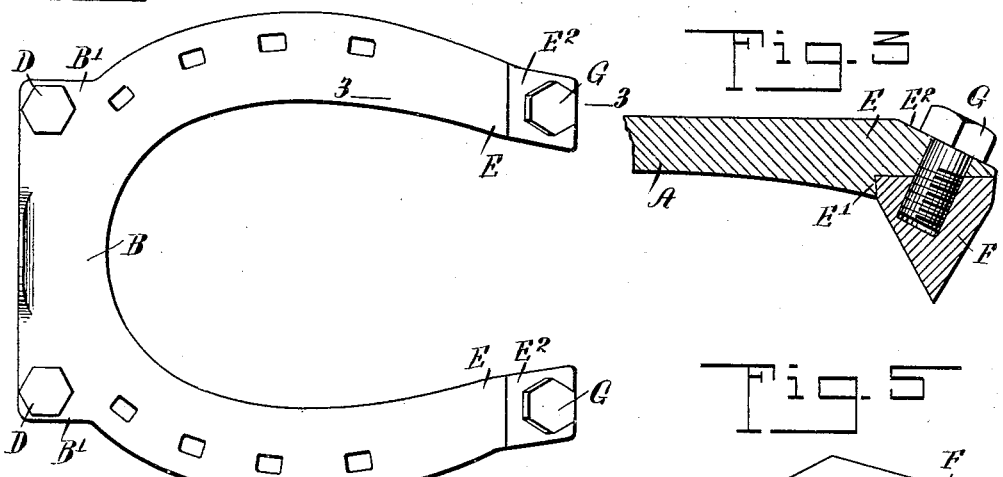
Fig. 2
Fig. 3
Fig. 4
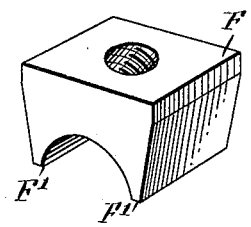
Fig. 5
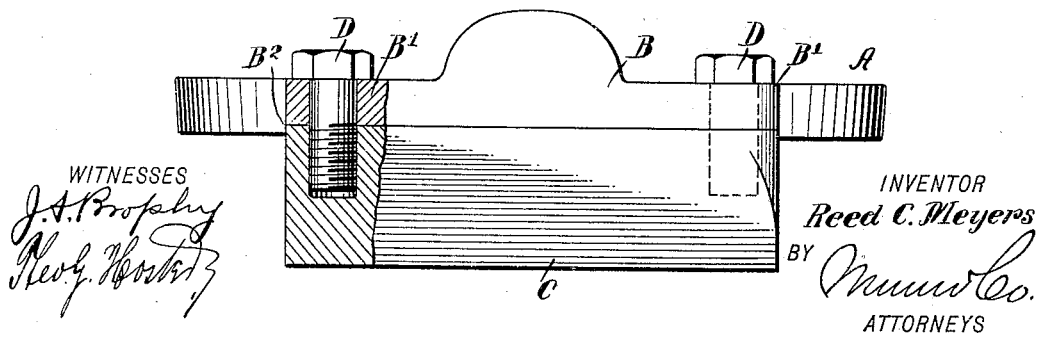
WITNESSES
J. A. Brophy
Geo. Hostetz
INVENTOR
Reed C. Meyers
BY
Munn & Co.
ATTORNEYS

UNITED STATES PATENT OFFICE.

REED C. MEYERS, OF TRENTON, NEW JERSEY.

HORSESHOE.

945,568.

Specification of Letters Patent.

Patented Jan. 4, 1910.

Application filed July 7, 1909. Serial No. 506,320.

*To all whom it may concern:*

Be it known that I, REED C. MEYERS, a citizen of the United States, and a resident of Trenton, in the county of Mercer and State of New Jersey, have invented a new and Improved Horseshoe, of which the following is a full, clear, and exact description.

The invention relates to horse-shoes having removable and renewable calks, and its object is to provide a new and improved horse-shoe, arranged to securely hold the calks in position without danger of the calks becoming accidentally loose while the horse-shoe is in use, to allow of conveniently removing the calks for sharpening, the renewal or exchange of calks for summer or winter wear, and without requiring the removal of the shoe from the animal's hoof. For the purpose mentioned, the horse-shoe is provided at the toe with sidewise extensions lying outside of the animal's hoof, and a front calk extending transversely on the under side of the horse-shoe and fastened in position by bolts passing through the extensions from the top and screwing into the calk near the ends thereof, the head of the bolts being outside of the animal's hoof. In order to hold the heel calks in place, the heels of the horse-shoe are beveled at the top and recessed at the under side, to form forward shoulders, the heel calks engaging the said recessed under sides, and bolts passing through the heels to screw into the heel calks at an angle thereto, the heads of the bolts resting on the bevel tops of the heels so as to be out of engagement with the hoof of the animal.

A practical embodiment of the invention is represented in the accompanying drawings forming a part of this specification, in which similar characters of reference indicate corresponding parts in all the views.

Figure 1 is a perspective view of the horse-shoe; Fig. 2 is a plan view of the same; Fig. 3 is an enlarged sectional side elevation of the same, on the line 3—3 of Fig. 2; Fig. 4 is an enlarged front view of the horse-shoe, parts being in section; and Fig. 5 is a perspective view of a modified form of heel calk.

The horse-shoe A is provided at its toe B with sidewise extensions B', and the under side of the toe B and the extensions B' is recessed to form a rear shoulder B², and in the recessed under side fits the transversely-extending toe calk C, secured in place by bolts D, passing through the extensions B' and screwing into the toe calk C near the ends thereof, the heads of the bolts D resting on the extensions B', so as to be completely outside of the animal's hoof when the horse-shoe is applied to the hoof in the usual manner. Thus by the arrangement described, the operator can apply a wrench or other tool to the heads of the bolts D, for unscrewing the same whenever it is desired to sharpen the toe calk C, or to renew the same, in case the old one is worn out. By abutting the toe calk C against the shoulder B², the bolts D are relieved of undue strain, and hence the bolts D can be readily screwed up or unscrewed as the case may be.

The heels E of the horse-shoe A are provided at the under side with recesses forming forward shoulders E', and onto the said recessed portions fit the heel calks F, secured in place by bolts G passing through the heels E and screwing into the heel calks F, the bolts extending at an angle, that is, in a forward and downward direction, as plainly indicated in Fig. 3, the heads of the bolts resting on the rearwardly and downwardly beveled tops E² of the heels E. Thus by the arrangement described, the heads of the bolts are outside of the heel of the animal's hoof, and consequently convenient access is had to the heads of the bolts by a wrench or other tool, for screwing up or unscrewing the bolts while the horse-shoe is in position on the animal's hoof. It will also be noticed that by abutting the heel calks F against the shoulders E' and screwing the bolts G into the heel calks at an angle thereto, the calks cannot possibly work loose.

The lower sharpened edges of the calks F are preferably arranged, so that the sharp edge of one calk extends transversely while the other extends longitudinally, as indicated in Fig. 1, to prevent lengthwise or sidewise slipping of the animal. The heel calks F may also be provided with two sharpened edges F', as indicated in Fig. 5.

From the foregoing it will be seen that although the approximate shape of the shoe is retained, the toe calk C as well as the heel calks F are fastened in position by the bolts D and G from the top of the horse-shoe, so that convenient access is had to the bolts at any time without removing the shoe from the horse's hoof and without danger of the bolts being worn out, as would be the case if the same were applied from underneath. It will also be noticed by reference to Figs. 3 and 4, that the toe calk C and the heel calks F are tapped for a desired distance without the tap hole passing to the outside of the corresponding calk, so that the bolts D and G are not liable to be injured as they do not extend through the calks C and F.

Having thus described my invention, I claim as new and desire to secure by Letters Patent:

1. A horseshoe provided with extended toe portions on both sides of the toe, the said extended portions and toe forming a straight front edge and a transverse shoulder having a straight edge parallel to the straight front edge, a triangularly shaped toe calk on the under side of the extended toe and toe portions, the front edge of the calk being flush with the said straight front edge, and the other edge of the calk abutting against the said shoulder, tapped recesses in the said calk, and bolts vertically disposed in the said recesses from the top.

2. A horseshoe provided with extended toe portions on both sides of the toe, the said extended portions and toe forming a straight front edge and a transverse shoulder having a straight edge parallel to the straight front edge, a triangularly shaped toe calk on the under side of the extended toe and toe portions, the front edge of the calk being flush with the said straight front edge and the other edge of the calk abutting against the said shoulder, tapped recesses in the said calks, extending into the calks from the top to within a distance of the bottom of the same, and bolts vertically disposed in the said recesses.

In testimony whereof I have signed my name to this specification in the presence of two subscribing witnesses.

REED C. MEYERS.

Witnesses:
 VICTOR B. HOLCOMBE,
 EDMUND WHITE.